United States Patent [19]
Veazey

[11] Patent Number: 5,505,153
[45] Date of Patent: Apr. 9, 1996

[54] VEHICLE-TRANSPORTABLE TWIN-HULLED BOATS

[75] Inventor: Sidney E. Veazey, King George, Va.

[73] Assignees: S. E. Ventures, Inc.; James K. Poole, both of King George, Va.; a part interest

[21] Appl. No.: 224,675

[22] Filed: Apr. 7, 1994

[51] Int. Cl.⁶ ........................................ B63B 1/00
[52] U.S. Cl. ............................. 114/61; 296/157
[58] Field of Search ..................... 114/61, 345, 352–354, 114/264, 265, 266, 267, 283, 343, 270; 296/157

[56] References Cited

U.S. PATENT DOCUMENTS

| | | | |
|---|---|---|---|
| 184,844 | 4/1959 | Woolever | D71/1 |
| 191,020 | 8/1961 | Fry | D71/1 |
| 278,138 | 3/1985 | Enfedaque | D12/304 |
| 2,743,510 | 5/1956 | Mauney et al. | 114/345 |
| 2,745,118 | 5/1956 | Potts et al. | 9/2 |
| 3,046,926 | 7/1962 | Miller | 114/61 |
| 3,119,128 | 1/1964 | Edmonson | 114/352 |
| 3,508,787 | 4/1970 | Strong et al. | 296/100 |
| 3,602,964 | 9/1971 | Currier et al. | 28/76 T |
| 3,933,112 | 1/1976 | Veazey | 115/1 |
| 4,086,863 | 5/1978 | Nitzki et al. | 114/61 |
| 4,140,076 | 2/1979 | Borglum | 114/61 |
| 4,236,474 | 12/1980 | Buirski et al. | 114/56 |
| 4,389,958 | 6/1983 | March | 114/39 |
| 4,498,409 | 2/1985 | Edel | 114/61 |
| 4,553,037 | 11/1985 | Veazey | 290/55 |
| 4,557,211 | 12/1985 | Schmidt | 114/61 |

(List continued on next page.)

FOREIGN PATENT DOCUMENTS

| | | | |
|---|---|---|---|
| 2648778 | 12/1990 | France | 114/61 |
| 0060788 | 5/1981 | Japan | 114/61 |
| 0259593 | 12/1985 | Japan | 114/61 |

OTHER PUBLICATIONS

"Hep–Cat" Jul. 1962.
Pp. 106–112 of Nov. 1949 Popular Science "The Inside Story of Gar Wood's Sea Speeder".
"Pickups: From the Barn to the Carport," New York Times, Jul. 18, 1993, p. F–8.
"Help for the Queasy: Odd Shop Smooths Sea's Ups and Downs", *The Wall Street Journal*, Nov. 20, 1987, p. 31.
"New Shape in Ships," *U.S. Naval Institute Proceedings*, Veazey, Feb. 1985, pp. 38–47.
"Innovative Uses of a Modified SWATH for Ocean Engineering," Sep. 1984, Veazey, Sidney et al., *Oceans Conf.* (*Proceedings of Oceans*, pp. 768–772).
"Swath Ships," Chapter 3 of Modern Ships and Craft, *Naval Engineers Journal*, Feb. 1985, pp. 83–112, Gore.
"Cap-a-Boat" flier, Altec Engr., Feb. 22, 1990.
"Cutting a Swath", *Popular Science*, Dec. 1991, p. 80.
Lee, "A General Overview of Swath Hydrodynamics," *Naval Research Reviews*, No. Two, 1986 (pp. 16–22, 24–27).
Shapiro, "Radisson Proposes Twin Hulls . . . ", *New York Times*, Jun. 16, 1991.

*Primary Examiner*—Edwin L. Swinehart
*Attorney, Agent, or Firm*—James K. Poole

[57] ABSTRACT

Twin-hulled boats such as SWATH (Small Waterplane Area Twin Hull) boats are designed and built to be so dimensioned as to fit transportably and removably atop the sidewalls of the open bodies or beds of various vehicles such as pickup trucks, trailers and the like. The horizontal deck and substantially solid hulls or struts of the boat provide a cover, closure or "cap" for the truck bed while installed. Such boats can be easily removed from the truck bed for use or storage. In one embodiment, the twin hulls have a cross section which is a hybrid of the relatively wide, shallow hulls of a catamaran and the narrow, deep struts attached to the lower flotation hulls of a SWATH boat. In the SWATH embodiment, the flotation hulls can be removed for separate transport, the struts themselves being secured atop the sidewalls, or the hulls can be left installed and themselves secured to said sidewalls.

26 Claims, 16 Drawing Sheets

U.S. PATENT DOCUMENTS

| | | | |
|---|---|---|---|
| 4,624,209 | 11/1986 | Loffler | 114/354 |
| 4,763,596 | 8/1988 | Yoshida | 114/256 |
| 4,798,153 | 1/1989 | Schmidt | 114/61 |
| 4,813,366 | 3/1989 | Elder | 114/61 |
| 4,817,548 | 4/1989 | Guergen | 114/61 |
| 4,867,090 | 9/1989 | Hall et al. | 114/61 |
| 4,907,518 | 3/1990 | Tunis, III | 114/56 |
| 4,909,169 | 3/1990 | Skandaliaris | 114/61 |
| 4,919,063 | 4/1990 | Hall et al. | 114/56 |
| 4,936,237 | 6/1990 | Walters | 114/61 |
| 5,379,710 | 1/1995 | Parnigani | 114/61 |

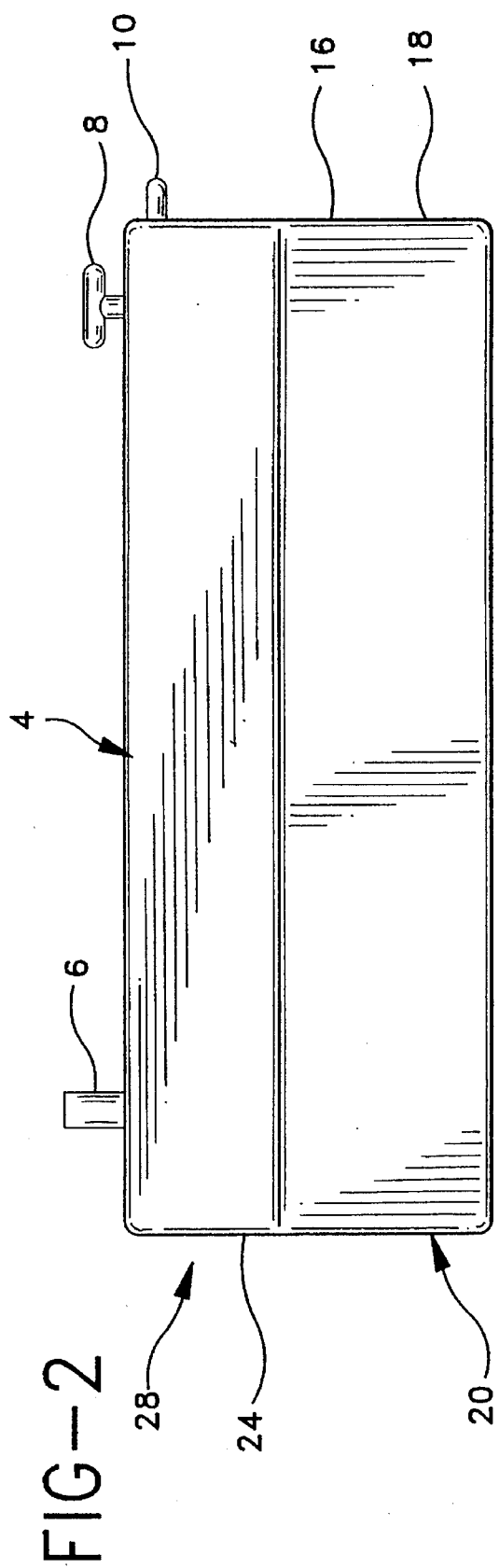
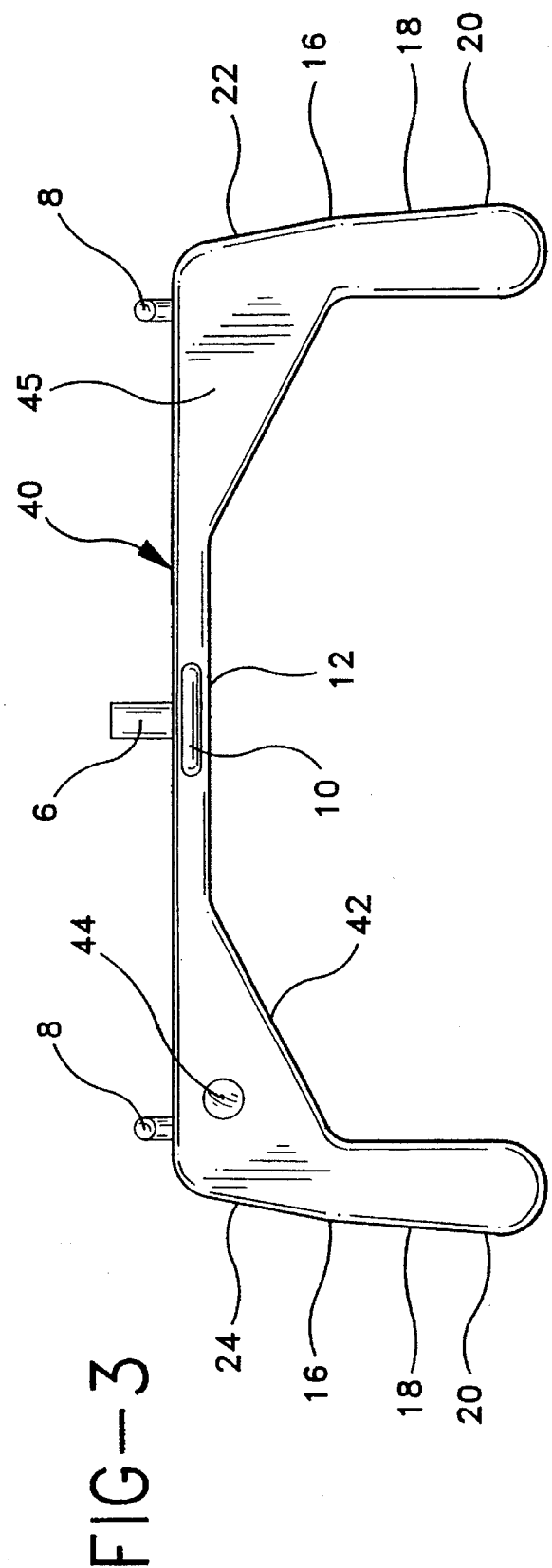

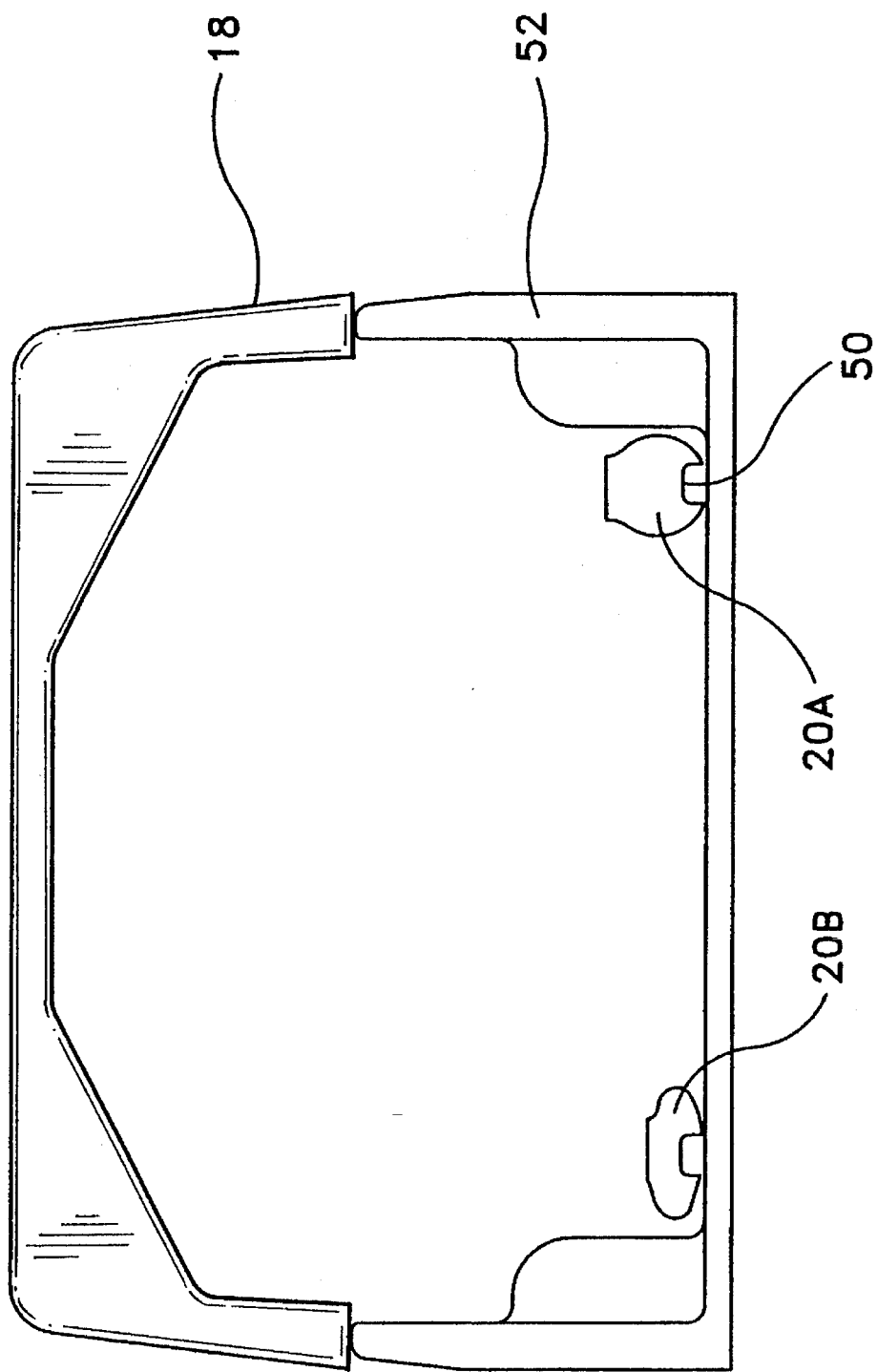

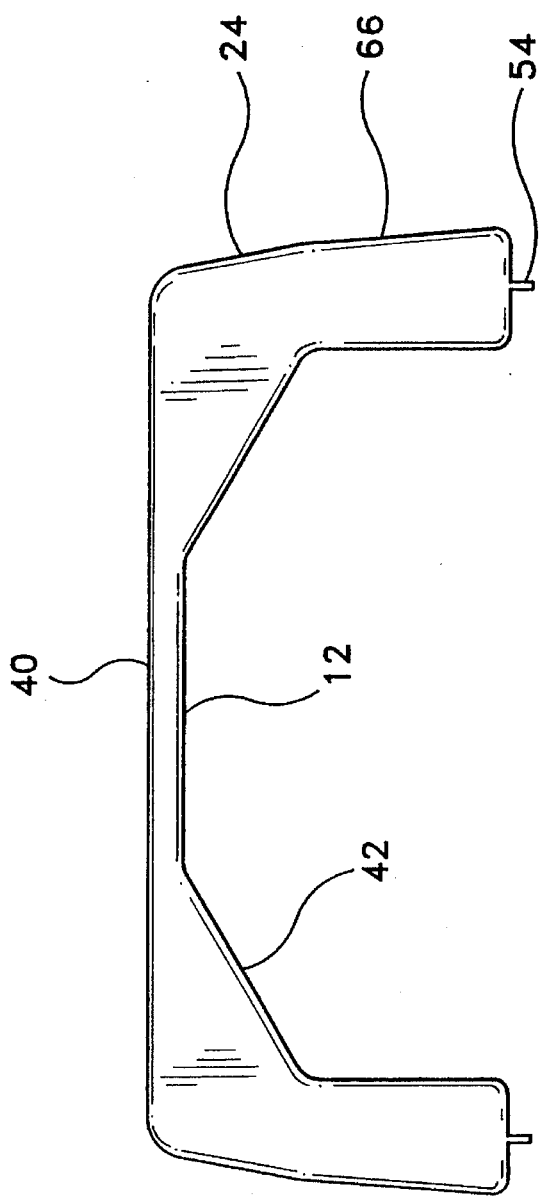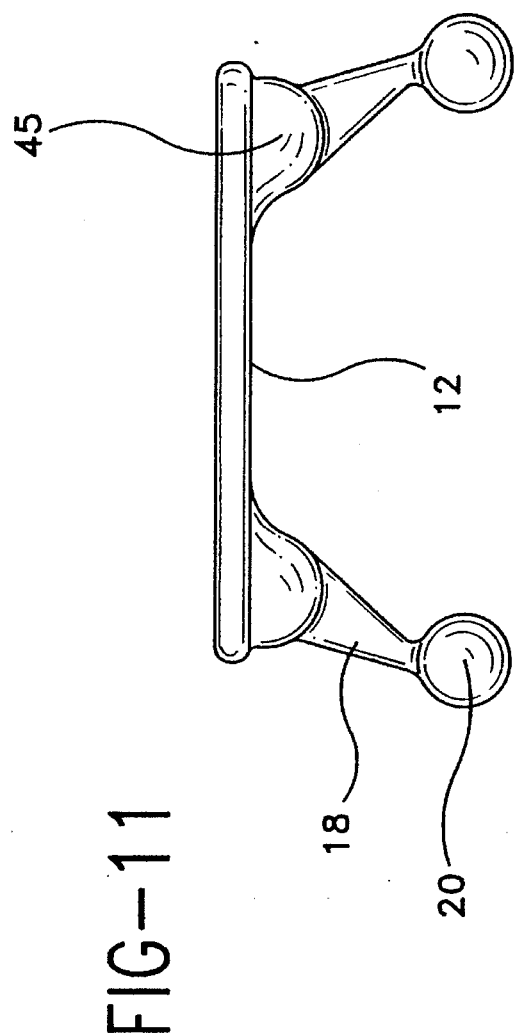

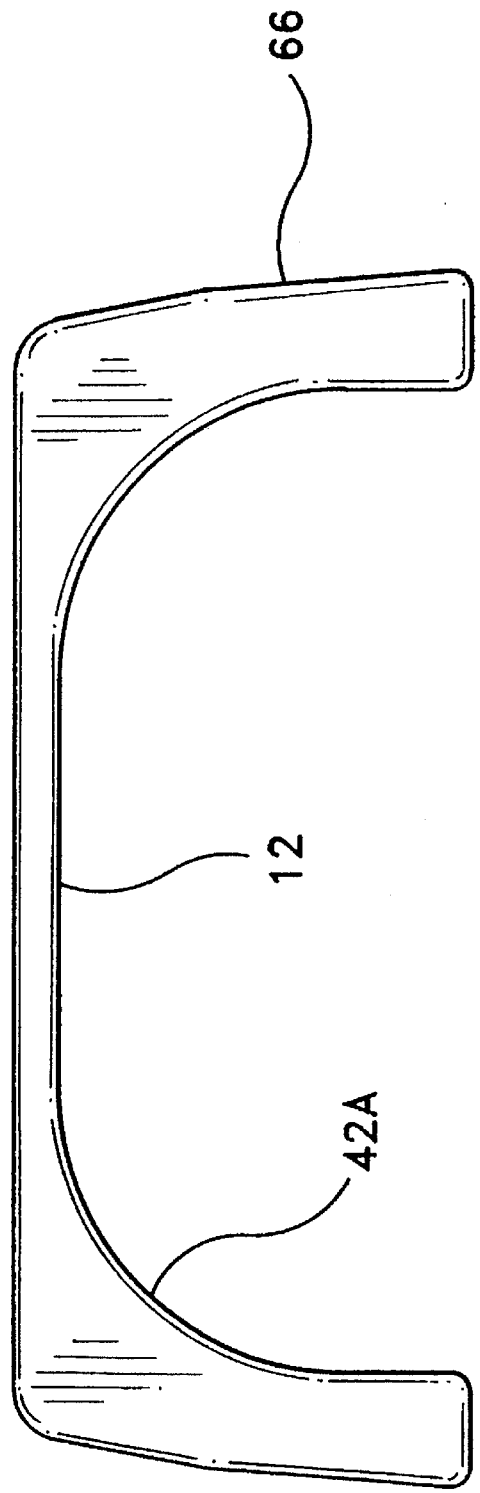

VEHICLE-TRANSPORTABLE TWIN-HULLED BOATS

This application pertains to twin-hulled boats, including Small Waterplane Area Twin Hull (SWATH) boats, designed for transport on vehicles such as pickup trucks. When installed on such trucks, the boats act as a top or "cap" for the open pickup bed.

BACKGROUND OF THE INVENTION

Small boats are widely used for recreational applications including water sports, hunting and fishing, and for various working uses around lakes, farm ponds, harbors and shipyards. When such boats are to be transported from place to place, they must typically be mounted on a trailer which is towed to the destination and used to launch the boat from a ramp. However, it is often desirable to transport such small boats without having to mount them on a separate trailer. One solution to this challenge is Applicant's U.S. Pat. No. 3,933,112, which provided a system for carrying a small boat atop a car or van, in which the inverted boat served as a temporary roof for a van. Hoist systems are available for raising such boats into position on the van roof or lowering them for launch. Another approach, ca. 1990, was the "CAP-A-BOAT," manufactured by ALTEC ENGINEERING of Elkhart, Ind. A pickup truck with a conventional "cap" covering the bed carried a flat-bottomed fishing boat in inverted position atop the cap. An electrical lift was provided for launching and retrieving the boat.

Small trucks of various types have become very popular, and include some of the largest selling motor vehicles in the United States, particularly in the form of pickup trucks ranging from "mini"-pickups through the modified passenger chassis truck (e.g., the Chevrolet "El Camino") to the standard two-door and four-door pickups and even larger pickups with long beds and reinforced rear wheels and axles. See, e.g., "Pickups: From the Barn to the Carport," *New York Times*, Jul. 18, 1993, p. F-8. Many of these pickup trucks are adapted to have camper units mounted in the beds, or to have the beds at least temporarily covered with a rigid structure or covering which may be called a "cap". Since such trucks are widely used in recreation and work applications where it would be desirable to transport a boat, it would be useful to produce a suitable boat which is adapted for transport by such trucks without the need of a trailer.

Efforts along these lines found in the prior art include U.S. Pat. No. 3,508,787, which discloses enclosures for pickup truck beds which are convertible into small boats. The enclosure, best seen in FIGS. 9 to 12 of the patent, forms a portion of the inverted hull of a conventional boat when in position on the truck. U.S. Pat. No. 4,236,474 discloses boats which include hull bodies designed to be be carried in inverted position in the bed of a vehicle such as a pickup truck. The hull body is assembled into a boat by adding at least one hull extension. As shown in FIGS. 16 and 17, such hull extensions can form the twin hulls of a catamaran. U.S. Pat. No. 4,624,209 discloses a "readily portable kit for assembling a multiple-hulled watercraft, such as a catamaran, from two or more open-hulled boats such as canoes". As shown in FIGS. 1 and 2, the disassembled kit can be mounted for transport atop a van.

A modern design for ships and boats known as the Small Waterplane Area Twin Hull (SWATH) design has been used in a variety of contexts ranging from small unmanned craft to large ships. Large passenger cruise liners and ferries using this design are in operation, and it has been proposed to use it for a cruise liner as the largest SWATH vessel ever built, the Radisson Diamond. SWATH ship and boat designs offer many advantages including speed and stability—see, e.g., "Help for the Queasy: Odd Ship Smooths Sea's Ups and Downs", *The Wall Street Journal*, Nov. 20, 1987, page 31. The U.S. Navy has used such designs for a variety of ships, and has patented many of the design concepts—see Applicant's article, "New Shape in Ships," *U.S. Naval Institute Proceedings* February, 1985, pp. 38–47.

Applicant's U.S. Pat. No. 4,553,037 also discloses a number of useful applications of SWATH hulls. Those depicted in FIGS. 3, 4 and 5 are of interest for the present application. A particularly useful feature for SWATH vessels disclosed in this patent (at column 6 and FIG. 14) is the concept of "angled struts" which improve the stability of the vessel in rough water. This patent is incorporated herein by reference for its descriptions and drawings of SWATH hulls and design principles. See also the paper presented by Applicant et al., "Innovative Uses of a Modified SWATH For Ocean Engineering," OCEANS Conference sponsored by Marine Technology and IEEE Ocean Engineering Society, Washington, D.C., Sep. 10–12, 1984 (*PROCEEDINGS OF OCEANS*, pp. 768–772).

General characteristics of SWATH vessels, with particular reference to naval ships and craft, are described by Gore in "SWATH SHIPS," Chapt. 3 of "Modern Ships and Craft", *Naval Engineers Journal*, February 1985, pp. 83–112.

Catamarans are among the oldest of boat designs, having been used by ocean-going Polynesians, and are widely used to this day as recreational sail and power boats. Due to their wide beam, transport on motor vehicles or trailers has often required at least partial disassembly, as described above in U.S. Pat. No. 4,624,209. Representative small catamaran boats are disclosed in U.S. Pat. Nos. 4,813,366; 4,086,863; Des. 184,184 and Des. 278,138.

In boats of the size range contemplated for the present invention, SWATH boats have clear advantages of reduced motions in a seaway over catamarans. Furthermore, due to the generally shallow, broad hulls typically employed in catamarans, one would not expect to find a catamaran of a length and beam suitable for enclosing the bed of a pickup truck or the like which included hulls deep (or tall) enough to provide a cap or closure of a suitable height when the boat was positioned on the sidewalls of the bed in the upright position.

SUMMARY OF THE INVENTION

It is an object of this invention to provide useful small boats which are easily transportable on vehicles with open beds such as various types of pickup trucks, as well as trailers, with or without sidewalls. It is a further object of the invention to provide transportable boats which can act at least temporarily as covers or "caps" for the open beds of vehicles including trailers and trucks, including various types of pickup trucks, when mounted thereon in the upright position. It is a further object of the invention to provide small boats which are stable in operations in water, relatively lightweight for their size and can be easily removed from the truck, trailer or the like to launching areas or replaced on the vehicle after recovery.

In accordance with the invention, these objects are fulfilled by a twin-hulled vessel, preferably a SWATH boat or a SWATH-catamaran hybrid, having twin hull means attached to a substantially horizontal and solid deck structure and descending substantially vertically downward from the lower surface thereof. Such boats are so dimensioned as to fit transportably and removably in an upright position atop a vehicle body having an open bed and sidewalls therefor, so as to form a closure therefor, the substantially horizontal deck structure thereby serving as the top portion of said closure and the twin hull means forming left and right side portions of said closure. Securing means are provided for securing the boat/closure removably in place atop the vehicle bed, preferably atop the sidewalls thereof. In preferred embodiments the boats are used in conjunction with trucks such as pickup trucks, forming a "cap" for the bed, but can also be used on utility trailers, camping trailers and the like, with or without sidewalls, to form a protective cover for the cargo compartment, bed or upper surface. Preferably the twin hull means descend outwardly from the deck structure at a sufficient angle from the vertical to improve the stability of the boat when afloat. These so-called "angled struts" also thereby provide an appropriate contour for the cap or closure for a truck bed by conforming substantially to the angled sides of the truck cab.

Preferably the twin-hulled boat is a SWATH boat wherein said twin hull means each comprise substantially solid and continuous struts extending substantially vertically below said deck structure for substantially the full length of the deck structure, and buoyant hull structures attached to each of said struts, wherein the two hull structures are spaced laterally such that said boat will fit removably atop the side walls of said open bed and thereby form a cap structure or closure for the open bed. Removably hinged enclosures attached to the front and rear of the boat when thus mounted, preferably fabricated at least in part of transparent material, complete the formation of a weatherproof cap or enclosure for the open bed.

Further in accordance with the invention, an embodiment of the SWATH boat includes hull structures which are removable and twin struts so dimensioned and configured as to fit transportably and removably upon the sidewalls of the open bed of such trucks or other vehicles, so that the hulls may be removed and transported in the bed or elsewhere in the vehicle. The deck and strut structures of the boat thus form a cap structure for the open truck bed, trailer or the like.

Still further in accordance with the invention, the twin-hulled vessel includes twin "hybrid" hulls rather than the strut-hull combinations used in the SWATH configuration. The hulls resemble somewhat the arrangement and configurations employed in the well-known catamarans, but are narrower in cross section and deeper, as discussed in detail below. These hulls are so dimensioned as to fit securely atop the sidewalls of a truck bed so as to be transportable thereon and form a cover or cap for the truck bed. Surprisingly, vessels featuring such hulls (which are intermediate in beam and depth between conventional catamaran hulls and SWATH strut-hull assemblies, and thus may be termed "hybrid" hulls) have been found to offer stable performance in the water which is nearly comparable to that of comparable SWATH boats dimensioned to fit atop similar truck beds. Further improvements in stability can be obtained by arranging the hulls in configurations comparable to the "angled struts" described above for the SWATH boats.

Other objects and advantages of the present invention will become apparent by perusing the following detailed description, the drawings and the appended claims.

BRIEF DESCRIPTION OF THE DRAWINGS

FIGS. 1, 2 and 3 show in perspective, side and rear views a generic twin-hulled boat mounted in accordance with the invention upon the sidewalls of the bed or a pickup truck to form a cap or closure for same. The truck is omitted from the views of FIGS. 2 and 3.

FIG. 9 shows a version of FIG. 8 in which as an alternate embodiment the buoyant hull structures are removed from the SWATH boat's struts so that the struts can rest directly upon the sidewalls of the truck bed and the hull structures are stowed in the bed or elsewhere for transport. Inflatable hull structures are shown in both inflated and deflated form.

FIG. 10 shows a a rear view of a preferred embodiment of FIGS. 1–3 in which the twin-hulled boat is a SWATH-catamaran hybrid whose hulls rest directly upon the sidewalls of the truck bed to form a closure thereof.

FIG. 11 is a rear view of a SWATH boat illustrating angled struts.

FIG. 12 is a rear view of a SWATH-catamaran hybrid illustrating the hybrid version of angled struts.

DETAILED DESCRIPTION OF THE INVENTION

The present invention employs small, light SWATH boats or SWATH-catamaran hybrids to provide stable, spacious small boats which can be easily transported aboard various vehicles such as pickup trucks, utility trailers or the like. Such boats can be easily removed from their temporary truck mountings for launching and replaced aboard the vehicles for transporting. When installed aboard the vehicles, the boats serve as cap or closure structures for the vehicles, fulfilling a variety of objectives including security, convenience and shelter from weather. The SWATH or hybrid boats can be designed to fit transportably aboard a great variety of truck beds of various dimensions, and can be propelled in the water by outboard or inboard motors (internal combustion, electrical motors or the like), sails, oars, pedal-driven propellors or wheels, or poles.

Some of the efficiencies of the SWATH design are attained by the use of twin hulls, each of which have relatively ideal length-to-diameter (L/D) ratios, which produce relatively high propulsive efficiency and relatively low drag. (Although the underwater hulls have significant surface areas, the low waterplane area inherent to the SWATH design results in a low total drag for the twin hulls.) Another significant parameter for a SWATH design is the ratio of the length of the hulls to the width between the outer surfaces of the hulls (or overall beam). Surprisingly, it has been found (or calculated) that SWATH boats having suitable ratios in the range from about 1 to about 2:1, preferably from about 1.2 to about 1.8:1, can be constructed to fit vehicle beds, e.g. pickup trucks ranging from mini-pickups to the largest pickup trucks. The ratio of the height of the hull structures to the overall beam is of course determined by the dimensions of the vehicle bed for which a closure is to be provided as well as boat stability considerations, and can be in the range of from about 0.3 to 0.6:1, preferably from 0.4 to about 0.5:1.

In describing the various embodiments of the invention, the nomenclature and conventions of boating, naval architecture and motor vehicles will be used from time to time. That is, the front and rear of a truck correspond to the bow and stern of a boat, and what are described as the right and left sides of a truck when facing the front are in a boat referred to as the starboard and port sides. Similarly, for vehicles (or other objects) resting or floating upon a horizontal surface or the water, the portion closest to such surface is the bottom or lower surface, and the opposite surface is the top, top surface or the like. The expression "and/or" is used in the conventional sense to mean one or both of two alternative species.

Figure 1:
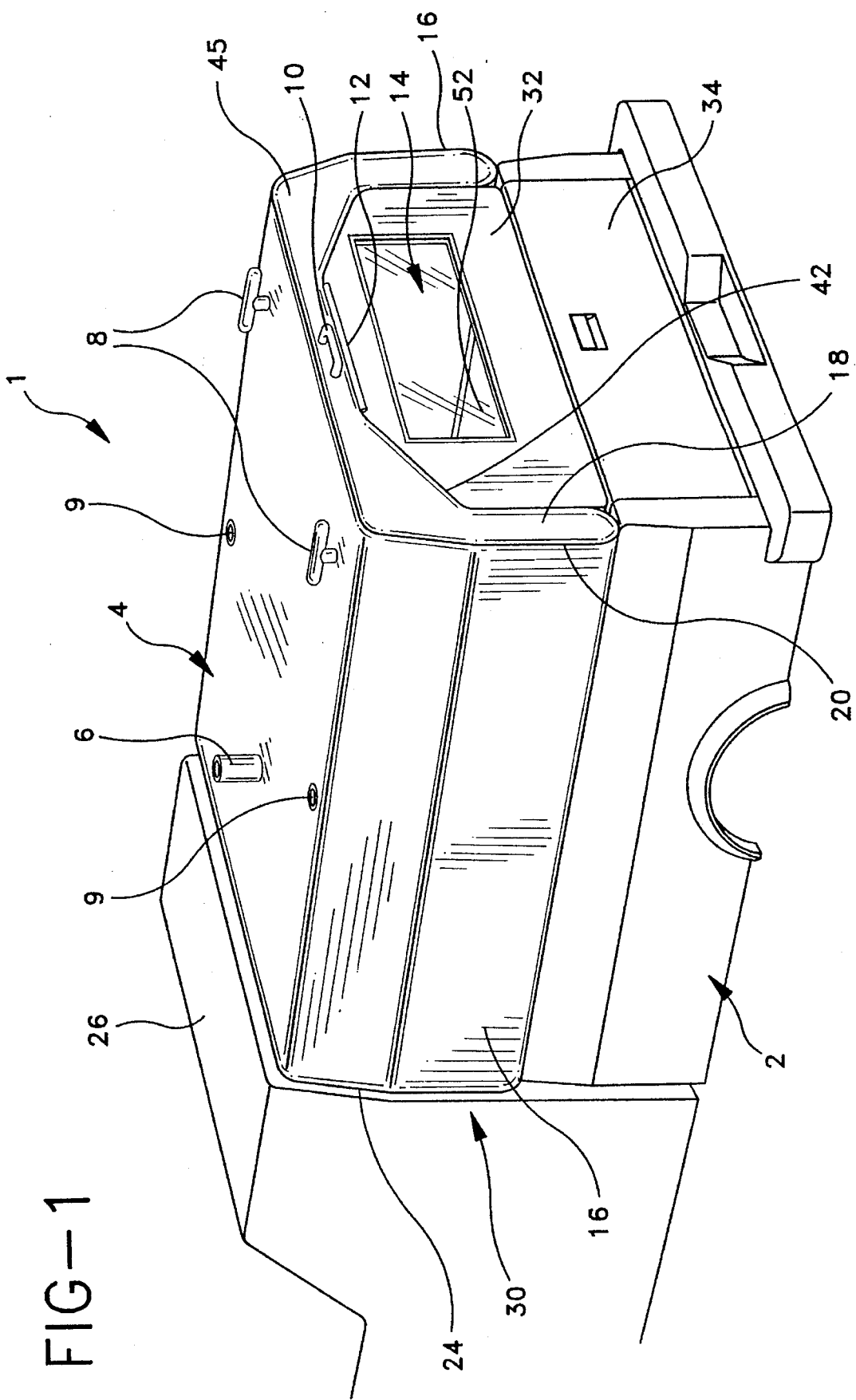

Referring now to the drawings, FIGS. 1 to 3 show a generic twin-hulled or SWATH boat (1) configured and dimensioned to fit atop the sidewalls of the bed of a modern pickup truck (2) secured in place for transport. The boat was molded in one piece of fiberglass, and is representative in form of both conventional SWATH boats and hybrid versions. The flat, continuous deck surface (4) is substantially horizontal when the boat is afloat or mounted atop the truck bed's sidewalls. Passengers, equipment and cargo can be mounted on deck while afloat, consistent with stability requirements, and a mast socket (6), cleats (8) and oarlocks (9) are provided for sailing with a "dinghy" rig or rowing if necessary. At least one motor mount (10) can be provided for mounting a small outboard motor of the internal combustion or electric variety. The inner or lower surface of the deck (12) provides the ceiling of the closure for the pickup bed (14).

The boat has twin hull means (16) comprising continuous struts (18) and hull structures (20), although the struts are thicker than the conventional SWATH struts would be for this size boat and accordingly, the hull structures are barely wider than the struts. As will be discussed later, a SWATH-catamaran hybrid boat would have hull means in which the struts and hull structures are essentially combined, the resulting hull means being of substantially the same width from top to bottom, or trapezoidal. The outer starboard and port surfaces of the hull means (i.e., struts in this SWATH) slant inward (see 22) from the hull structures to the deck in this model, using compound angles to the vertical to produce a slight "tumble-home" (24) near the deck which is compatible with the dimensions and curvature of the pickup cab (26).

Although a boat designed and dimensioned to fit across the bed of a pickup truck need not necessarily be exactly the same length as the truck bed, this provides the optimum way of providing a satisfactory and complete closure of the truck bed. As shown, when the boat is secured in the truck bed in upright position the bow of the boat (28) almost touches the rear surface (30) of the truck cab. However, a portion of the boat's forward deck can extend over the cab or tailgate if desired. Suitable closure means (32) are employed to close at least the open portions of the boat which are exposed above the truck bed. (For this purpose, any suitable means may be used, such as rollable curtains with snaps, securing cords or other securing means, solid partitions of metal, wood or synthetic compositions, or the like. Preferably at least a portion of the closures are transparent to allow for visibility from the truck cab.) At the rear of the boat and truck, a solid tailgate (34) provides a partial closure of the truck bed. Whether or not a tailgate is available, closure of the rear of the truck-boat combination can be provided by removably hinged doors of glass, metal or synthetic compositions, roll-down curtains which can be snapped or latched in place, or flexible covers of canvas, plastic or other suitable materials which snap or lash in place.

Both the inner and outer surfaces of the boat's struts or hull means preferably make a slight angle with the vertical in the vicinity of the waterline, as shown in FIGS. 1 and 3. Such "angled struts" improve the stability of the boat in the water, as described in Applicant's U.S. Pat. No. 4,553,037 and in, e.g., U.S. Pat. No. 4,557,211. In the boat shown, the central portion (40) of the deck is of a uniform, relatively small thickness, and the lower surfaces of the deck (12) and the struts (18) are joined by a surface (42) describing an acute angle with the vertical, say from about 40 to about 60 degrees. This joining surface could as well be a concave curvature (See FIG. 12), so that the inner strut surface and underside of the deck (12) are arcuately joined. While conventionally the struts of a SWATH boat would join the lower deck surface more directly, the provision of this effectively thickened portion of the deck provides a stronger structure and also storage space if desired, plus additional "angled strut" effects. Optional ports (44) in the stern (45) provide access to long, narrow storage compartments which can be conveniently used for fishing rods, oars or other accessories which may fit.

Figure 7:
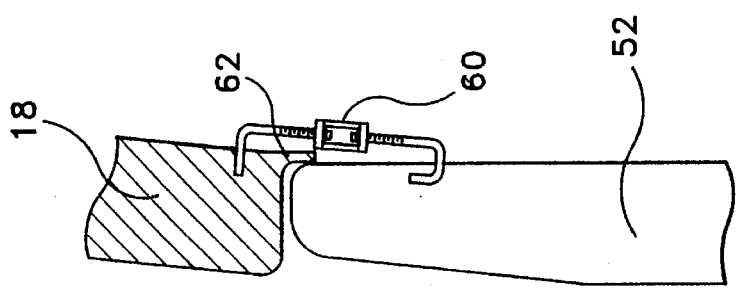
FIGS. 4 to 7 illustrate various means of securing the hull structures or struts of the boat to the sidewalls of the truck bed.
Figure 4:
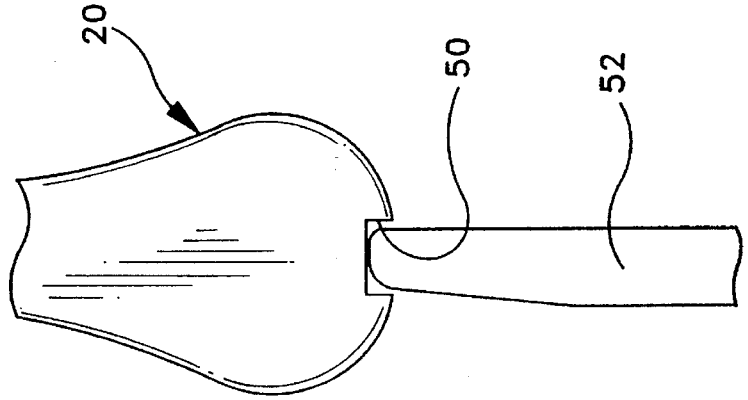

As shown in detail in FIGS. 4, 7 and 10, the hull structures are secured to the sidewalls of the truck bed by the small keels or notches on the bottoms of the hull structures which fit inside and/or outside the sidewalls to prevent slippage, and by cords, straps or other means used between cleats or other mechanical fixtures on the inside surfaces of the hull structures and the truck sidewalls. Any suitable mechanical means can be used to secure the boat removably in place, keeping it from moving in any direction while the truck is moving.

FIGS. 4, 5, 6 and 7 show in partial detail rear views of the boat-truck combination in which the boat is a conventional SWATH with struts relatively narrow compared with the width of the hull structures and illustrate various means of securing the hull structures directly to the sidewalls of the truck bed. It must be emphasized that any suitable physical means can be used to secure the boat to the truck bed sidewalls, with the most suitable means selected for each truck-boat combination. In FIG. 4, a recess (50) on the bottom of the hull structure (20) is sized to fit exactly over the truck bed sidewall (52). The mating surfaces can be covered with nonskid material to minimize the possiblity of longitudinal sliding.

Figure 6:
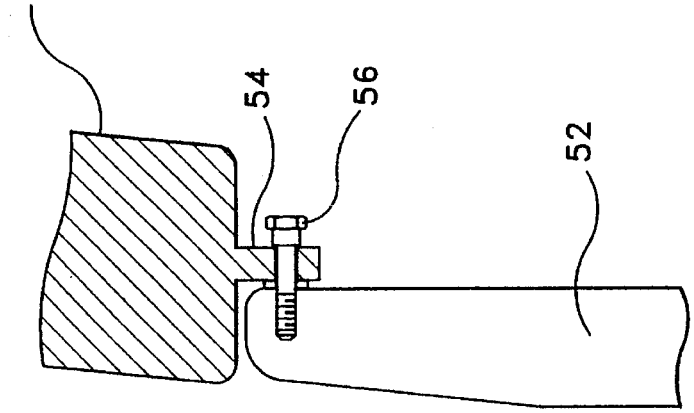
Figure 5:
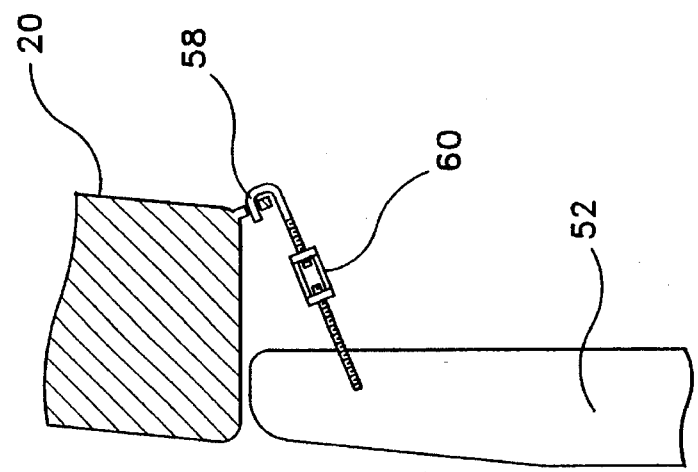

FIG. 5 shows a hull structure which can be either a conventional or hybrid SWATH. The small keels (54) at the bottom of the hull structures fit securely but removably between the sidewalls of the truck bed, and are secured thereto by bolts (56) or other suitable fasteners. FIG. 6 shows a similar hull-sidewall combination in which an angled "bilge keel" (58) or other securing point is provided and is connected to a securing point inside the sidewall by a turnbuckle system (60) or other tensioning means, thus fastening the hull structures tightly to the sidewalls (52). FIG. 7 shows the strut (18) alone positioned on sidewall (52) by flange (62) and a turnbuckle system (60).

Figure 8:
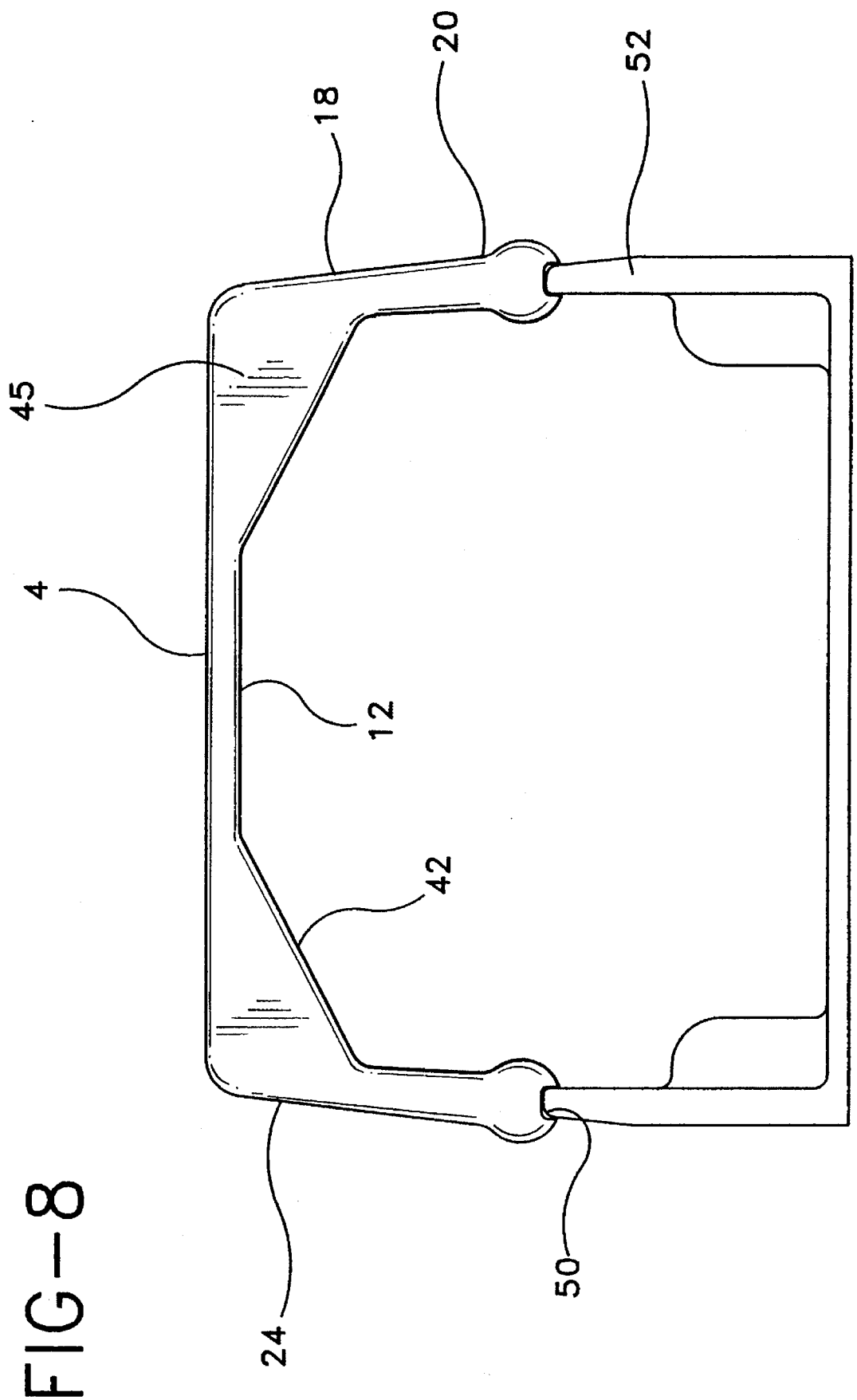
FIG. 8 shows a rear view of the boat-truck combination of FIGS. 1–3 wherein the boat is a SWATH and the buoyant hull structures rest directly on the sidewalls of a truck or utility trailer bed.

FIG. 8 shows a true SWATH boat positioned atop the sidewalls of a pickup bed. The boat includes a deck portion (4), struts (18) and hulls (20) which are notched (50) to fit over the truck bed sidewalls (52) to hold the boat in position. the same arrangement can be used for typical utility trailers—in fact, some such trailers are fabricated from old pickup truck beds. The boat can also be fastened by any suitable means to the floor of a trailer (if sized to fit within the sidewalls) or on the flat bed of an open trailer, the top of a folding camping trailer, camper, recreational vehicle, or the like.

FIG. 9 shows a version of the SWATH boat of FIG. 8 in which the hull structures (20) are removable and the bottom surfaces of the struts (18) themselves are secured to the top surfaces of the truck bed sidewalls (52) by any suitable means, e.g. as illustrated in FIGS. 4–7. The struts preferably have small flanges or other protrusions which fit inside the sidewalls and help to position the boat laterally, as shown in FIGS. 5 and 7. For example, the two components can be secured together by turnbuckles as described above and shown here, by straps, lashings or other connecting means. One hull structure (20A) is shown placed in the truck bed in the same form as used in the water, while hull structure (20B) is an inflatable model which is shown deflated. Not only the hull structures, but the struts and deck structures can be made of inflatable components from materials commonly used in producing inflatable boats or rafts. Inflatable hulls or pontoons can be produced in accordance with U.S. Pat. No. 2,745,118, which is incorporated herein by reference.

Figure 9A:
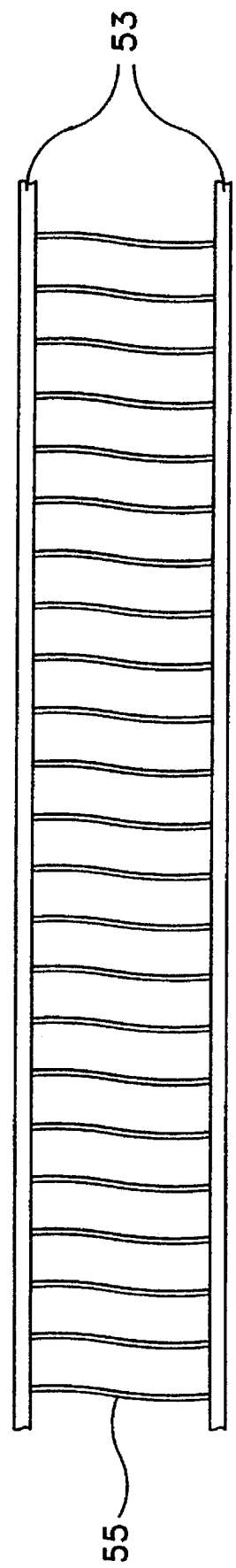
FIG. 9A shows a dual-wall inflatable fabric which can be used for such inflatable structures.

A preferred material is an inflatable dual wall fabric, comprising dual layers of rubberized fabric or the like (53) held together by fibers (55) positioned between the layers of fabric, as shown in detail in FIG. 9A. In such fabric, inner and outer layers (53) of rubberized fabric, rubber, polymeric film or the like are separated by a void but held together by fibers (55). When the void space is inflated, the overall structure become strong and rigid due to the tension exerted on the fibers between the layers. The void between the fabric layers can be inflated either independently or together with the inflation of the vessel or structure involved. Further information on such fabrics and their employment is found in U.S. Pat. No. 3,602,964, which is incorporated herein by reference.

Any suitable materials and methods of boat-building can be used to produce boats for use in the invention. For example, in addition to inflatable materials, conventional wood components and/or metals such as aluminum can be used. Vacuum-forming of various thermoplastic polymeric materials can be used to form individual components. A preferred method of production involves the use of cured fiberglass and resin, described as "fiberglass" for short. Briefly, the method involves measuring the vehicle bed to obtain critical dimensions for forming a closure for the bed, constructing a mockup of the boat as it would appear in finished form, and preparing fiberglass molds for the parts of the boat from the mockup. Curable materials comprising fiberglass and resin are then laid on the molds to produce parts (including, e.g., deck structures, hull means including struts and hulls, etc.). The parts thus laid up are cured and finally assembled to form the boat, which will serve as a closure when mounted atop the vehicle in question.

The bed of the typical pickup truck is approximately five by eight feet in size and uniform in width. Some pickup trucks have beds which vary slightly in width from front to rear; to fabricate boats to fit the sidewalls of such trucks it may be necessary to design the hull structures to be closer together or farther apart at the bow than at the stern. Such arrangements, termed "toe-in" or "toe-out", can be used in such boats and may even improve their stability in some cases, as pointed out in U.S. Pat. Nos. 4,086,863 and 4,557,211. The boat can be up to about twelve feet long for large truck beds, but is preferably from eight to ten feet long, or just long enough to fit removably within the selected truck bed. Trailers can of course be smaller than a truck bed, or perhaps longer (although not much wider due to highway restrictions). Boats can still be produced according to the invention to serve as "caps" for trailers, preferably falling within the dimensionality ratios discussed above so as to be stable in the water.

FIG. 10 illustrates a hybrid SWATH hull, which may be compared with the conventional SWATH of FIGS. 1–3 and 11. A similar deck structure with top (40) and bottom (12) is present, the tumble-home (24) approximates the contours of the truck cab and the angled fillet (42) between hull means (66) and the underside of the deck (12) improves water stability. The hull means (66) incorporate both hulls and struts in one component and are boxy or trapezoidal in cross section. The small keels (54) improve stability against yaw while afloat, and serve to anchor the boat inside the sidewalls of the vehicle, e.g. as discussed above for FIG. 5. FIG. 11 illustrates a simple SWATH boat having "angled struts" (18) to improve stability. FIG. 12 illustrates a version of the hybrid SWATH boat in which the fillet 42A is curved, so that hull means (66) are arcuately attached to the underside of the deck (12). Similar stability effects are obtained.

Figure 13A:
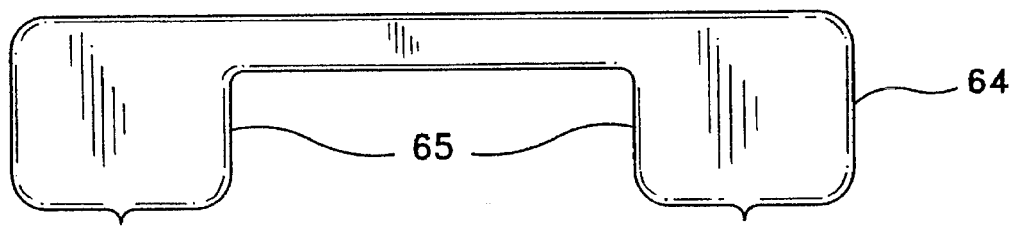
FIGS. 13A, 13B and 13C are cross-sectional rear views illustrating/comparing representative hull forms for SWATH, catamaran and hybrid boats.
Figure 13B:
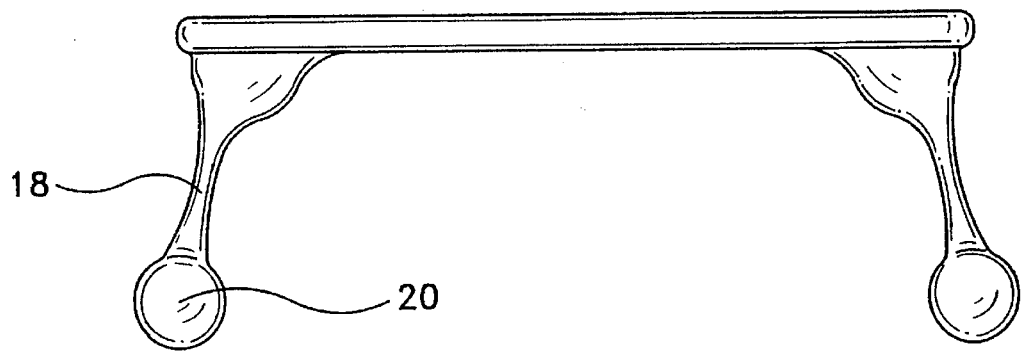
Figure 13C:
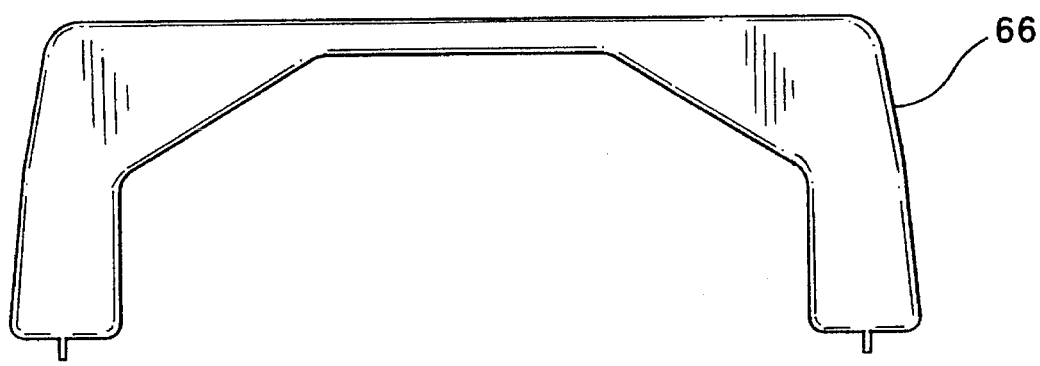

FIGS. 13A, 13B and 13C compare and contrast the hull arrangments and forms of SWATH and other boats having approximately equal maximum beams, and illustrates that the hull forms of catamarans (64) (in FIG. 13A) are typically much shallower and broader than the characteristic strut-buoyant hull configuration of a SWATH boat (18/20) (in FIG. 13B). The angled struts of the SWATH boat (13B) can approximate the angle of the sides of a truck cab, to blend into the structure when in place as a closure for a truck bed. Such differences typically prevail over substantially the entire length of the hulls, even as they narrow and curve upward at the bow. Catamaran hulls for a boat having a beam comparable to the width of a truck bed would therefore provide too narrow a gap (65) between the inner surfaces of the hulls (and probably insufficient height as well) to provide a useful "cap" or closure for a truck bed. The hybrid versions of the present invention (FIG. 13C) feature hull forms (66) that are substantially deeper than catamaran hulls, but generally not so deep as the strut-buoyant hull structure assemblies of SWATH boats of comparable size. The integrated hull/struts are wider than SWATH struts.

Figure 14:
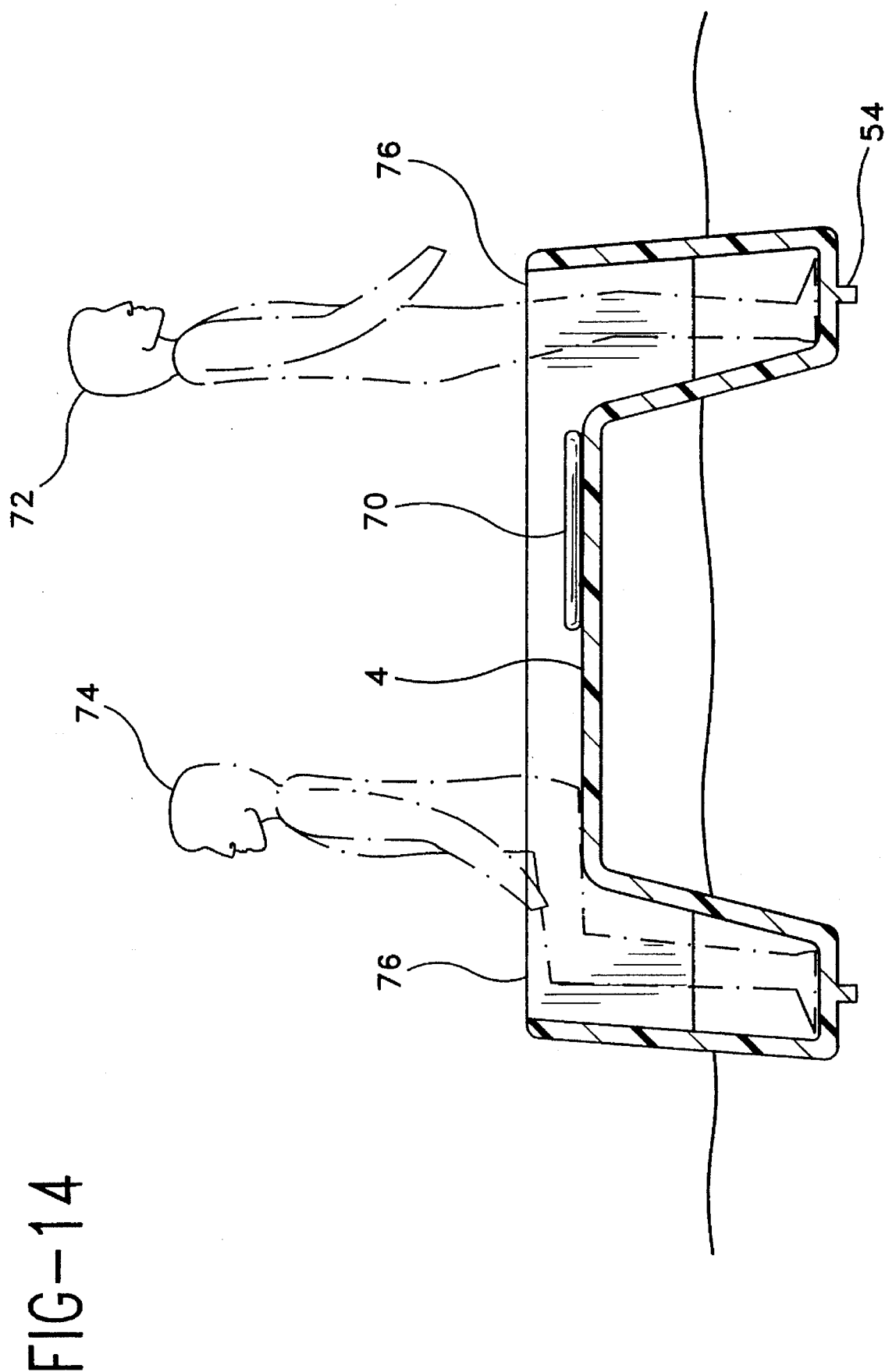
FIGS. 14 and 15 are cross-sectional views of hybrid boats illustrating internal hull spaces provided for passenger seats, leg room, specialized storage, propulsion, etc.
Figure 15:
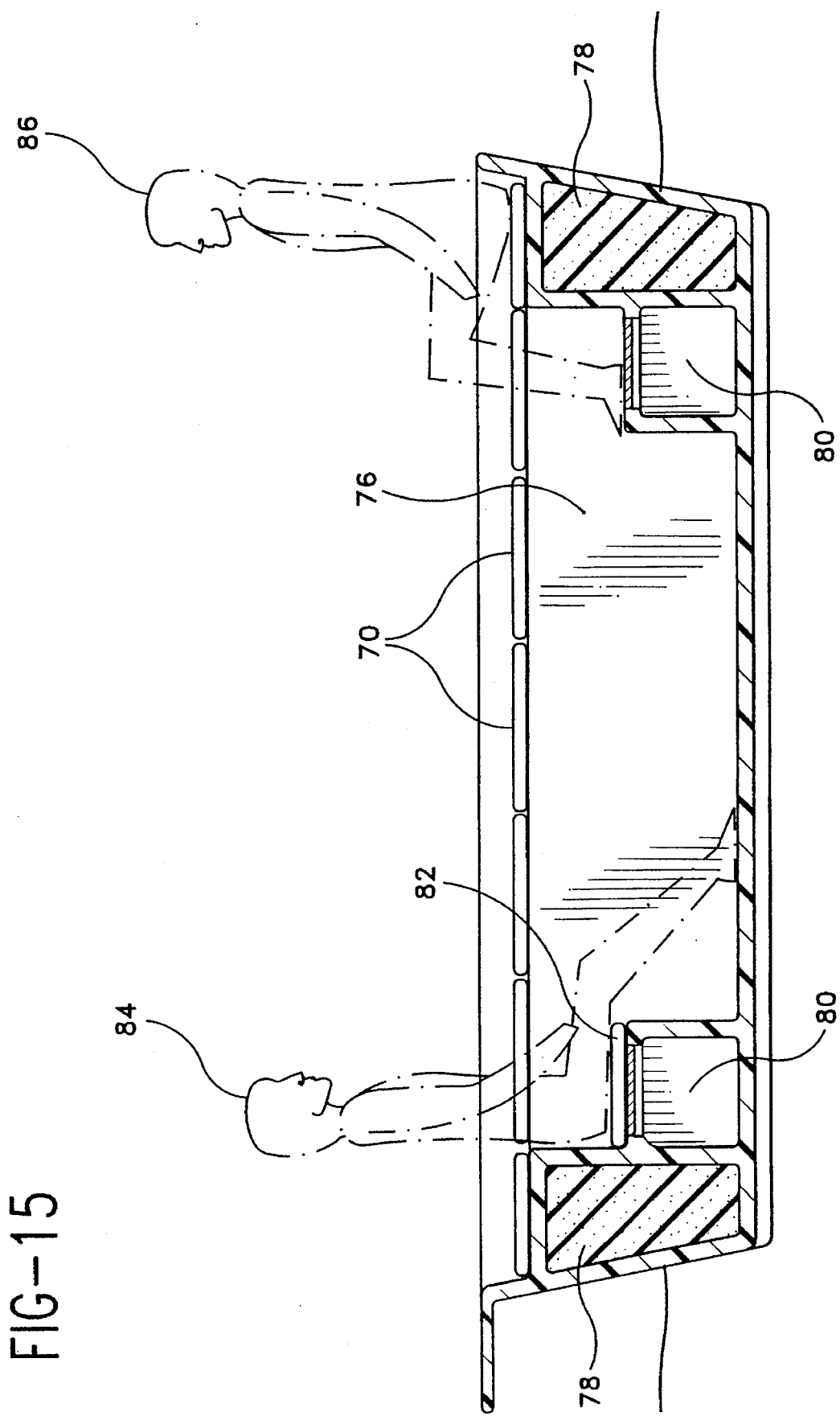
Figure 16:
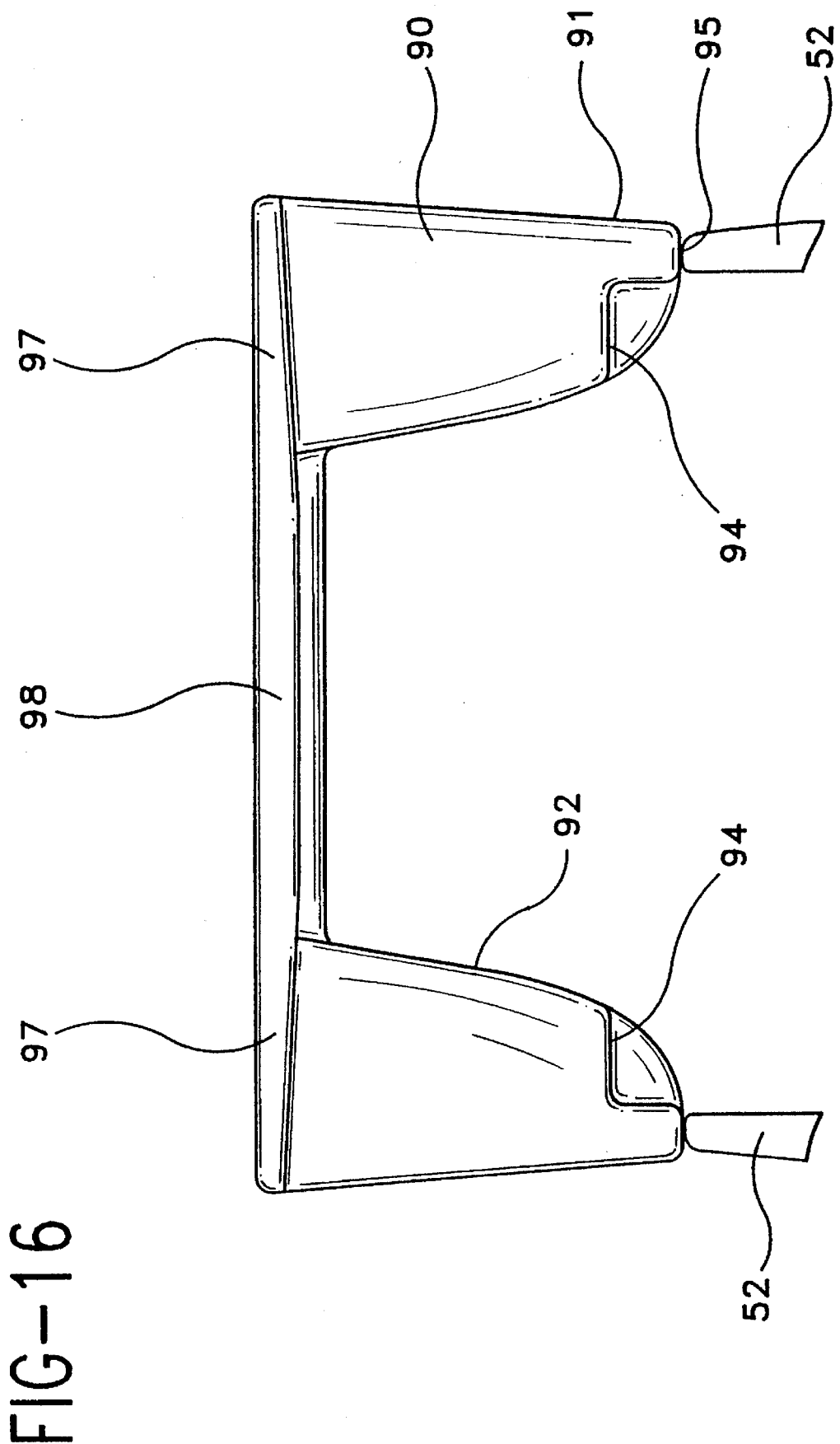
FIGS. 16 to 20 illustrate a preferred embodiment of a hybrid boat built to fit a 5 by 8 foot pickup bed.

FIGS. 14 and 15 show arrangements of the preferred SWATH-hybrid boats which have void spaces within the hull structures wide enough to accomodate the legs of seated or standing passengers. In FIG. 14, passenger (72) is shown standing in the void space (76) in the hull on one side, while another passenger (74) is seated on the deck surface, facing outboard. The deck surface (4) is recessed slightly from the tops of the hull structures. Cushions (70) can be used or fitted to the top of this deck surface, either temporarily or permanently, for use by seated or reclining passengers, respectively. Passengers seated atop the deck surface would normally face outboard, with their feet in the hull void space, a suitable position for fishing or the like.

FIG. 15 illustrates a different seating arrangement, with the boat viewed in a longitudinal cross-section with the bow at left. Seat cushions (70) are placed along the outer surfaces of the deck so that passengers can sit thereon and face inboard. Portions of the void spaces (76) in the hull structures are partitioned off and used for storage, fuel tanks, bait boxes, propulsion spaces, foam flotation or the like. Representative voids are shown here as (78) and (80), assigned for fuel tanks and bait or ice boxes, respectively. Cushioned access covers (82) can be fitted to permit passengers to sit within the void spaces facing fore or aft in the boat. For instance, in FIG. 15 passenger (84) is seated atop a bait box with cushioned top while passenger (86) is seated on a cushion atop fuel tank (78).

Since boats in accordance with the invention can be made in a wide variety of sizes, shapes and configurations and may be quite heavy when fully loaded, many different means may be used to mount and dismount them from the vehicle bed. Small, lightly laden boats may be bodily lifted and lowered by at least two strong persons. Of course, a suitable hoist near a launch ramp would be helpful. Camper jacks can be used to raise the boat while the vehicle is moved into or out of position, and various types of portable skids or rails may be used, assisted by vehicle-mounted hoists if necessary.

A preferred embodiment of a hybrid boat built to fit a 5 by 8 foot pickup truck bed is shown in FIGS. 16 to 20. Built to fit a typical eight foot pickup truck bed, the boat features twin hull structures (90) which are trapezoidal through most of their cross-section, having outer hull surfaces (91) which are substantially vertical and inner hull surfaces (92) which form an acute angle to the vertical from bottom to top. This feature provides the effect of angled struts for stability. The forward inboard bow portions (94) of the hull structures are rounded for lift and streamlining, and the outer forward portions (95) (as well as the after portions of the hull) are flat to rest upon the vehicle sidewalls. Outboard keels (54) are provided at the base of each hull structure to assist in stabilizing the boat when afloat and also to secure it removably inside the sidewalls of the pickup bed, the keels fitting outside the sidewalls so that the bottoms of the hull structures rest on the tops of the sidewalls. A solid upper deck surface (98) is provided for the bow portion, with a narrow surface (97) provided around the remaining periphery of the deck area. The forward portion of the deck (98A) extends beyond the generally flat bow portion of the hull (which is designed to fit the rear of the truck cab) and is positioned over the cab roof. Cushions (70) can be installed thereon for passenger seating. Despite the boxy contours imposed by the required fit on a vehicle bed, the overall boat design is pleasing in appearance, in or out of the water.

Figure 19:
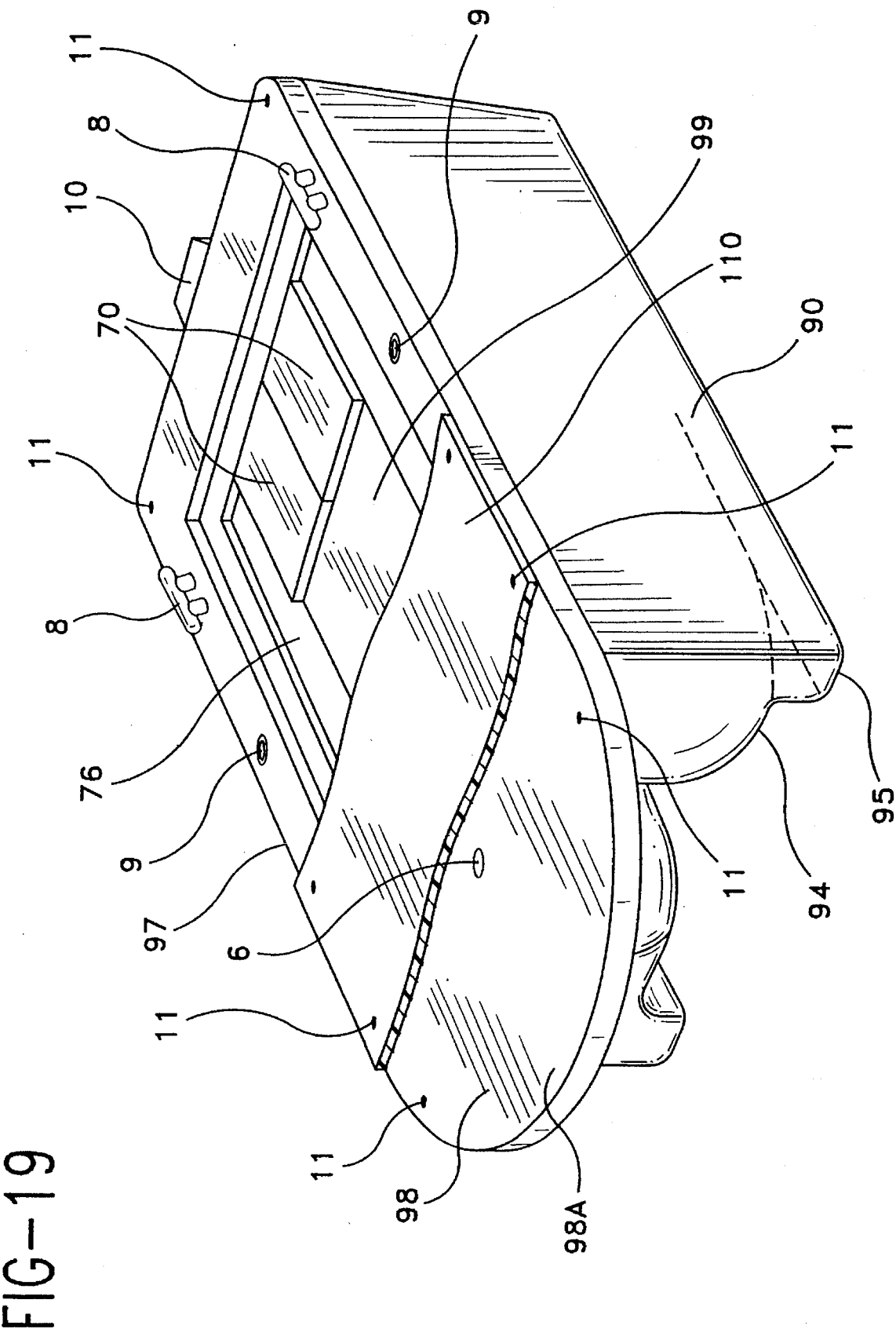
Figure 20:
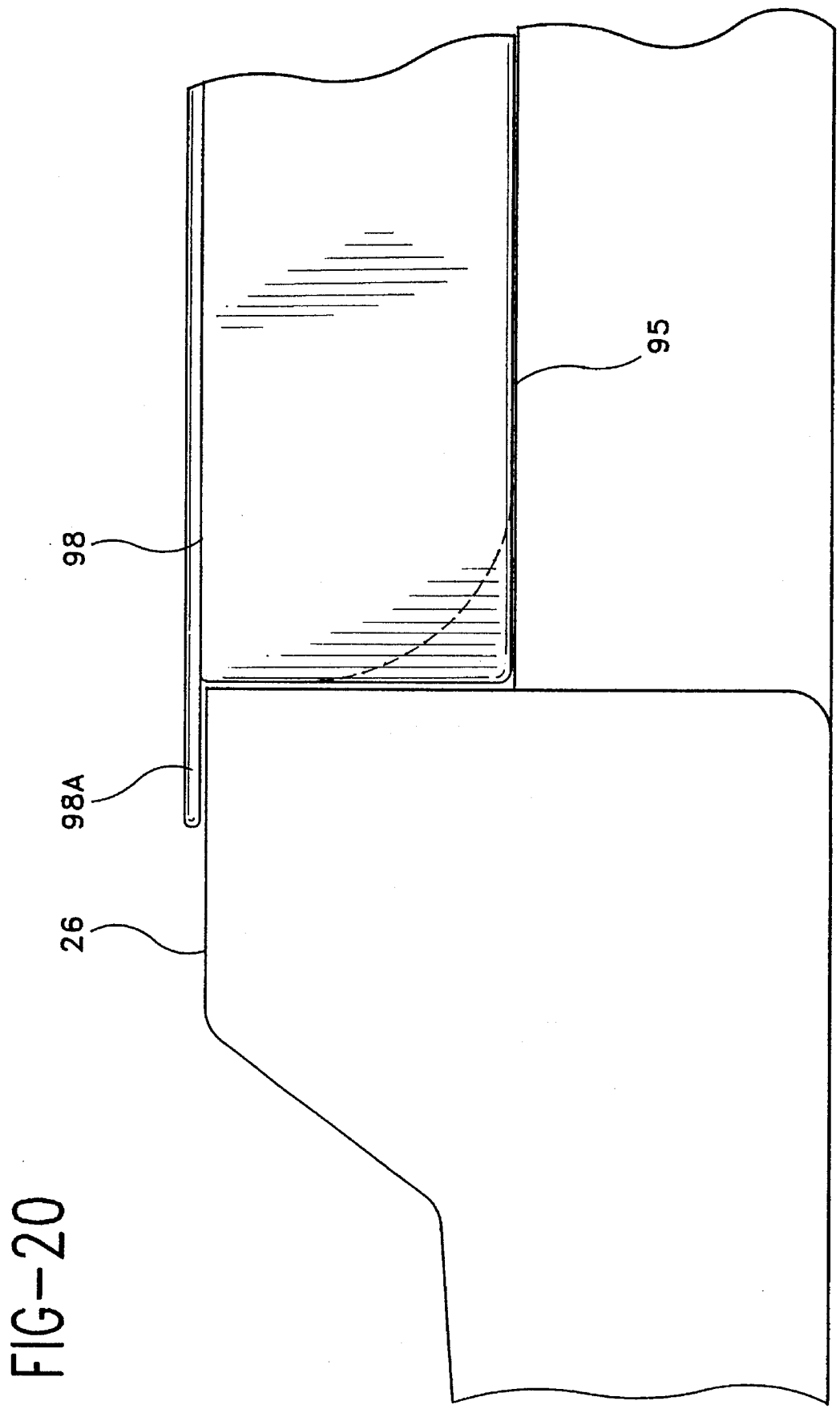

A socket (6) for mounting a mast for sailing, sockets (9) for oar locks, cleats (8) and motor mount (10) for an outboard motor are provided for propulsion. The lower deck surface (99) is continuous and lies between the inner surfaces of the hull structures. The top of this surface is accessible to the passengers, and cushions (70) can be mounted thereon for seated or reclining passengers. The boat thus configured can be used for sleeping purposes, with suitable tent or canopy structures erected from the outer deck surface for protection from the elements. Such structures are not shown herein, but can be similar to those shown in FIGS. 5–7 of U.S. Pat. No. 4,624,209, which is incorporated herein by reference. Mounting poles for such structures can be placed in fittings (11) as shown in FIG. 19.

Figure 17:
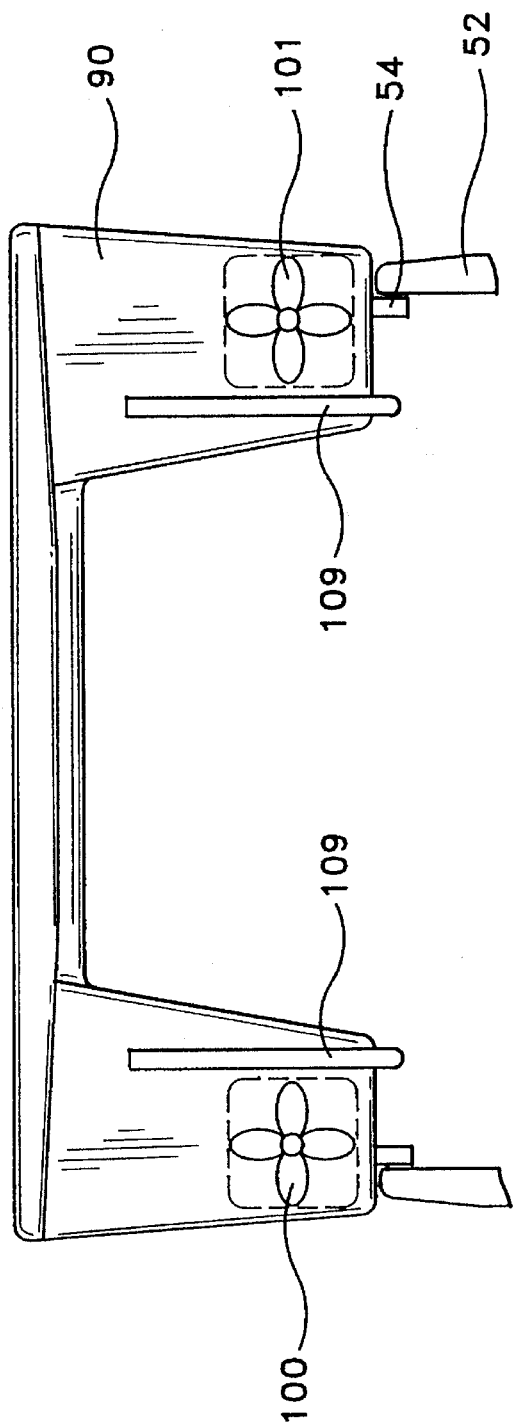
Figure 17A:
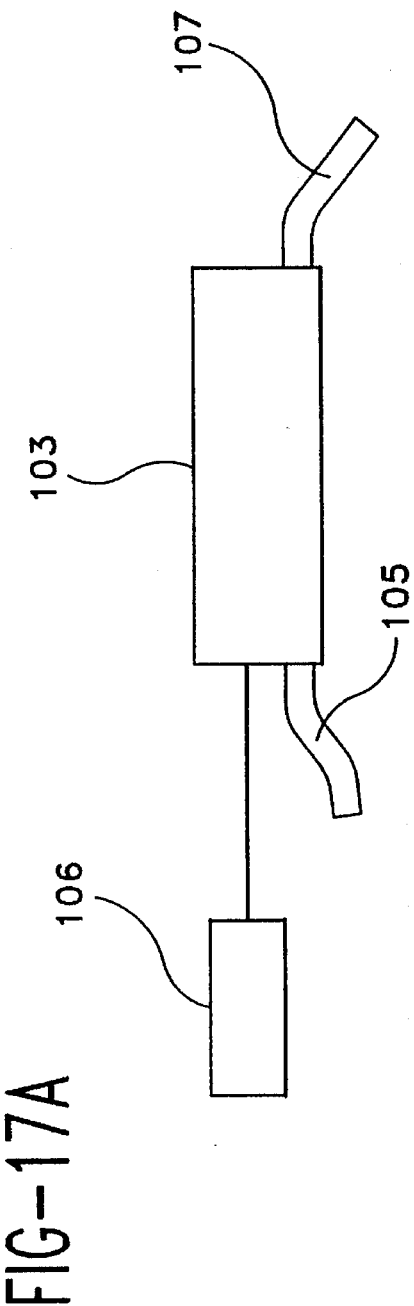
FIG. 17A illustrates details of a propulsion system.
Figure 18:
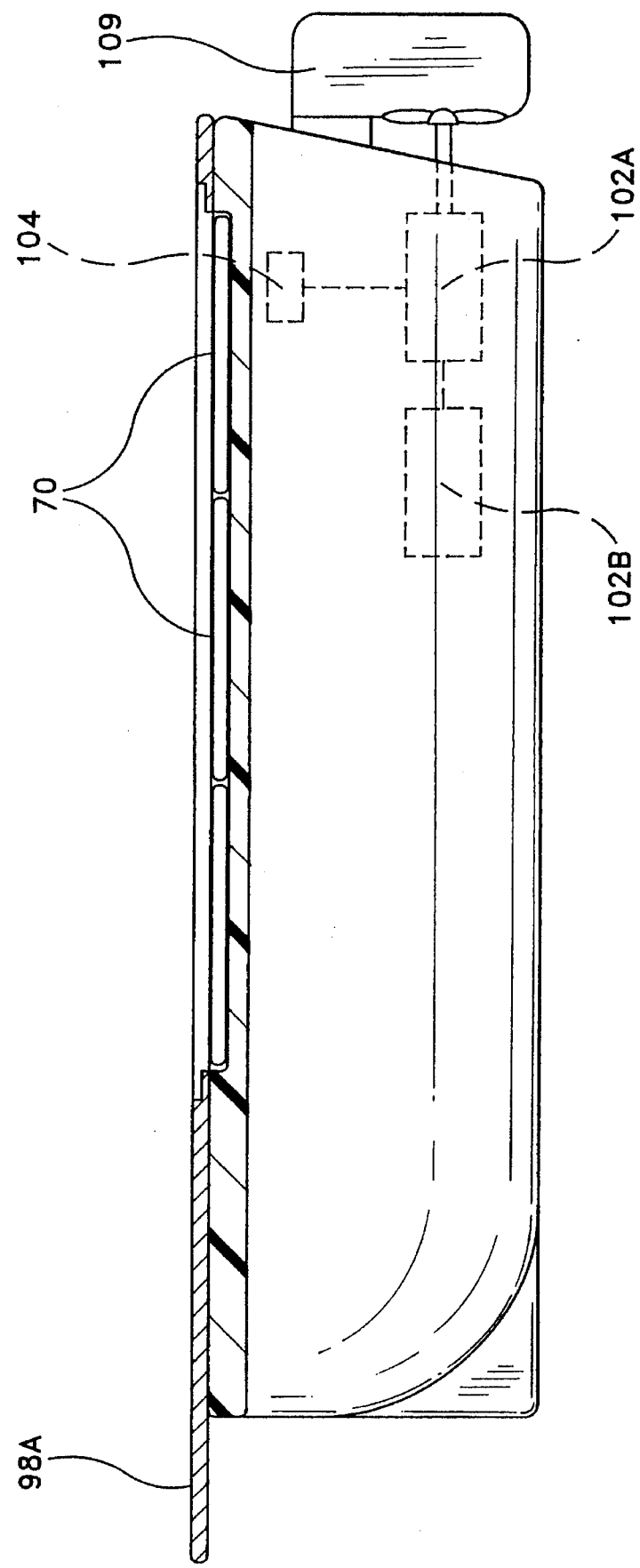

As discussed above for FIGS. 14 and 15, void spaces (76) can be used for a variety of purposes. In this embodiment, twin propulsion units (100) and (101) are shown. Normally these units would be of the same type, but shown here are a propeller unit (100) powered by an electric motor (102A) with battery box (102B) and suitable connections and a control box (104). Propulsion unit (101) is a water jet unit driven by a comparable electric motor (or, alternatively, by a small internal combustion engine with intake and exhaust systems directed through the forward and after portions of the hull structures). In operation (FIG. 17A), the pump (103), driven by power unit (106) takes in water through intake (105) and discharges it through nozzle (107). The nozzles can be made steerable and controlled though suitable mechanisms (not shown), or with either power system, the boat can be steered with twin, removable rudders (109) which are controlled by suitable mechanical or electromechanical control mechanisms (not shown). Since the exposed void spaces would be subject to filling with water when in use in the water (through spray or rain) or even when emplaced atop the truck, a streamlined cover (110) (partially shown in FIG. 19) is placed over the total deck surface when the boat is mounted on the truck. The cover can also be partially installed to protect the passengers and/or other contents of the void spaces while the boat is in the water, or installed over the pickup bed to protect its contents from the elements, etc. after the boat is removed. To handle excess water that is taken in while the boat is in the water, conventional drains, bailing devices or portable bilge pumps can be used (not shown).

It must be understood that many variations in hull form and configuration can be designed into any boat or series of boats of these types, but in comparing critical dimensions such as hull shape, width and depth for boats of comparable length and beam (e.g., dimensioned to fit a given truck bed), the differences will be readily apparent. In particular, as shown in FIGS. 13A–13C the hybrid hulls (66) are substantially equal in width from top (or at least just below the point at which they attach to the deck structure) to bottom, and this width is significantly greater than that of a normal SWATH strut. Preferably, the width of the hybrid hulls ranges from about one foot to about two feet over most of their depth, and most preferably ranges from about 14 to about 18 inches. The resulting void interior space (76) can be used for various purposes in either enclosed form or open and accessible form, and is much more useful in boats of this size than the void space in the narrow struts of SWATH boats of comparable size. As discussed above, in various preferred embodiments portions of the internal void space of the hybrid hulls can be used to provide storage and utility space accessible from the deck structure. Particular advantages are obtained by using this space for seats and foot spaces for passengers, as the passengers gain greater comfort and efficiency while the stability of the boat is improved because of the lower center of gravity. Furthermore, constraints on passengers to remain substantially amidships in the boat rather than at the bow or stern can contribute to greater stability about the pitch axis.

Rather than using motor drive or oars, the boat can be pedal-powered, with conventional mechanical means for translating rotary or reciprocal foot motion into propellor rotation fitted to the boat to permit at least one passenger to provide propulsive power. Since such mechanical devices are well known in the art, they are not illustrated here.

The objects and advantages of the present invention will be further illustrated by the following nonlimiting examples.

EXAMPLES

Having disclosed and claimed the feature of angled struts to provide improved stability for SWATH craft in his U.S. Pat. No. 4,553,037, Applicant built a number of prototype boats further developing this concept. In 1983 a large (8 by 20 feet) SWATH raft was built for the "Rambling Raft Races" on the Potomac River in the Fredericksburg, Va. and Washington, D.C. areas. The raft performed well, carrying about eight people on deck in very stable fashion so long as they maintained an essentially even weight distribution.

A smaller SWATH was built for sailing in "Hobie cat" fashion, constructed of aluminum sailboat masts, styrofoam and using 8" PVC pipe as the hull members. This boat had a deck about eight feet square, with canvas stretched between the frames. It performed reasonably well under a conventional sloop sail rig, but required modifications, i.e., shortened strut lengths to lower the center of gravity and permit reasonable weight shifts while afloat.

The first SWATH constructed to serve as a cap or closure for a pickup truck was built in 1991 to fit a full size pickup truck, having width and length of approximately five by eight feet, and had angled struts about six inches wide in cross section and about 2 feet in depth. This type model is shown in rear view, mounted on a pickup truck, in FIGS. 1 to 3. This boat was mainly a test platform to confirm that a SWATH dimensioned to fit atop a pickup truck bed could provide stable and useful service for passengers. Since the struts were so narrow, it could be used mainly as a platform boat for sailing, fishing or the like, with passengers and cargo limited mainly to the top of the deck structure. While the boat floated well and was reasonably stable, it was apparent that improvements could be gained by providing seating and leg space for passengers below the top of the deck structure and lowering the center of gravity.

The next prototype or example represented a hybrid of the SWATH and catamaran hulls, as shown in FIGS. 14 to 20. By broadening the the beam of the hulls of a SWATH boat with a hull length of 8 feet to about 1.25 feet, a hull length/beam ratio of about 6.5 resulted. By reducing the depth of the hulls, adequate flotation and stable operation with a load were obtained. The resulting hulls, 15 inches wide through most of their depth, can be hollow to accomodate seating and/or ample foot room for passengers facing forward, aft, inward or outboard from either side of the boat. Furthermore, this relatively generous interior void space can be employed for a number of other practical purposes such as propulsion units, fuel tanks, battery boxes, coolers, bait boxes, fish tanks and seats, all of which can be built in to strengthen the hull and provide convenience for the operator.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A twin-hulled boat having twin hull means attached to a substantially solid deck structure and descending substantially vertically downward from the lower surface thereof, said boat being so dimensioned as to fit transportably and removably in an upright position atop a vehicle body having an open bed and sidewalls therefor so as to form a closure therefor, said solid deck structure thereby serving as the top portion of said closure and said twin hull means forming left and right side portions of said closure and comprising securing means having mechanical interlocks and tensioning means for securing said boat/closure transportably and removably in place atop said sidewalls.

2. The twin-hulled boat of claim 1 wherein said vehicle is a truck.

3. The twin-hulled boat of claim 1 wherein said vehicle is a trailer.

4. The twin-hulled boat of claim 1 which is a SWATH boat wherein said twin hull means each comprise substantially solid and continuous struts extending for substantially the full length of said deck structure and buoyant hull structures attached to the bottom of each of said struts.

5. The twin-hulled SWATH boat of claim 4 wherein said struts descend outwardly from said deck structure at a sufficient angle from the vertical to improve the stability of said boat when afloat.

6. The twin-hulled SWATH boat of claim 4 wherein said hull structures are so dimensioned as to fit the sidewalls of said truck body and to be secured with said securing means.

7. The twin-hulled SWATH boat of claim 4 wherein said hull structures are removable for separate transport while the deck and strut portions of said boat are adapted to serve as a closure for said vehicle body, said struts being so dimensioned as to fit the sidewalls of said vehicle body and to be secured thereto with said securing means.

8. The twin-hulled SWATH boat of claim 7 wherein at least said hull structures are inflatable.

9. The twin-hulled SWATH boat of claim 4 which has an overall length to beam ratio in the range of from about 1 to about 2:1 and said hull structures have length to diameter ratios in the range of from about 6 to about 9:1.

10. The twin-hulled SWATH boat of claim 9 wherein said hull structures are substantially round in cross-section through a major portion of their length.

11. The twin-hulled SWATH boat of claim 9 wherein said hull structures are substantially as deep as they are wide in cross-section through a major portion of their length.

12. The twin-hulled SWATH boat of claim 9 wherein the ratio of the height of said hull structures to the overall beam of said boat is in the range of from about 0.3 to about 0.6:1.

13. The twin-hulled boat of claim 1 which is a hybrid SWATH-catamaran having hull structures substantially equal in width from top to bottom, wherein said hull structures contains open void spaces to accomodate passengers.

14. The twin-hulled hybrid SWATH-catamaran of claim 13, wherein said hull structures descend outwardly from said deck structure at a small angle from the vertical and said hull structures have cross-sections which are substantially trapezoidal, the larger horizontal side thereof being attached to said deck structure.

15. The twin-hulled hybrid SWATH-catamaran of claim 14, wherein the inner surfaces of each hull meet the lower surfaces of the deck through an oblique straight line which is effective to improve the stability of said boat when afloat.

16. The twin-hulled hybrid SWATH-catamaran of claim 13, wherein said hull structures are so dimensioned as to fit securably and removably atop said sidewalls of said truck body and to form the left and right side walls of said closure.

17. The twin-hulled boat of claim 2 wherein said truck body is a pickup truck bed.

18. The twin-hulled hybrid SWATH-catamaran of claim 14, wherein the inner surfaces of each hull meet the lower surface of the deck through a concave curved line which is effective to improve the stability of said boat when afloat.

19. A method of producing a SWATH or hybrid SWATH-catamaran boat having twin hull means and a substantially solid horizontal deck structure and so dimensioned as to fit transportably and removably in an upright position atop a vehicle body having an open bed and sidewalls therefor so as to form a closure for the vehicle bed, wherein the boat's deck structure serves as the top portion of said closure and said twin hull means descending substantially downward from the lower surface of said deck structure form right and left side portions of said closure, said method comprising steps of:

a. measuring the vehicle bed to obtain critical dimensions for said closure;

b. constructing a mockup of said boat;

c. preparing fiberglass molds for parts of said boat from said mockup;

d. laying curable materials comprising fiberglass and resin on said molds to produce parts for said boat comprising said deck structure and said twin hull means; curing same; and e. assembling said parts to produce said boat/closure.

20. The method of claim 19 wherein said vehicle body is a pickup truck bed.

21. A SWATH or SWATH-catamaran hybrid boat produced by the method of claim 18.

22. A truck-boat combination comprising a pickup truck having an open bed comprising right and left sidewalls, a cab wall at the forward end thereof and optionally a tailgate at the rear end thereof and a twin-hulled boat having twin hull means attached to a substantially horizontal deck structure and descending substantially vertically downward from the lower surface thereof, said boat being so dimensioned as to fit transportably and removably in an upright position atop said open bed so as to form a closure therefor, said boat being positioned transportably, removably and securably in an upright position thereon, with said twin hull means being positioned atop said right and left sidewalls and fastened with securing means so as to form right and left side portions, respectively, of said closure for said bed, such that the structure formed by said deck structure and said twin hull means form a closure which substantially covers and encloses the truck bed.

23. The truck-boat combination in accordance with claim 22 wherein said twin-hulled boat is a SWATH boat and said twin hull means each comprise substantially solid and continuous struts extending for substantially the full length of said deck structure and buoyant hull structures attached to the bottom of each of said struts.

24. The truck-boat combination of claim 23 wherein said struts are angled to improve the stability of said boat when afloat and to provide a suitable contour for said closure for said pickup bed.

25. The truck-boat combination in accordance with claim 22 wherein said twin-hulled boat is a hybrid SWATH-catamaran having hull structures substantially equal in width from top to bottom.

26. The truck-boat combination of claim 25 wherein the inner and outer surfaces of said hull structures are arranged at angles to the vertical which are effective to improve the stability of said boat when afloat and to provide suitable contours for said closure for said pickup bed.

* * * * *